United States Patent [19]

Jones

[11] 4,249,514
[45] Feb. 10, 1981

[54] TRACKING SOLAR ENERGY CONCENTRATOR

[75] Inventor: Andrew R. Jones, Murrysville, Pa.

[73] Assignee: Westinghouse Electric Corp., Pittsburgh, Pa.

[21] Appl. No.: 884,887

[22] Filed: Mar. 9, 1978

[51] Int. Cl.³ .............................................. F24J 3/02
[52] U.S. Cl. ................................... 126/438; 126/424; 126/443
[58] Field of Search ............... 126/270, 271, 438, 439, 126/440, 443, 424, 425; 350/288, 289, 292, 293, 299, 303, 304; 237/1 A; 206/0.7, 0.6; 248/475 R, 488; 52/791

[56] References Cited

U.S. PATENT DOCUMENTS

| 3,052,229 | 9/1962 | Wenger | 126/271 |
| 3,161,265 | 12/1964 | Matsch et al. | 52/791 |
| 4,038,972 | 8/1977 | Orrison | 126/271 |
| 4,071,017 | 1/1978 | Russell et al. | 126/271 |
| 4,078,549 | 3/1978 | McKeen et al. | 126/271 |
| 4,079,725 | 3/1978 | Chadick | 237/1 A |
| 4,108,154 | 8/1978 | Nelson | 126/271 |
| 4,148,564 | 4/1979 | Devin et al. | 126/270 |

OTHER PUBLICATIONS

Duff, W. S. and W. W. Shaner, "Solar Thermal Electric Power System: Comparison of Line Focus Collectors," Solar Energy, vol. 5, pp. 244–271, 1976.
"Fixed Faceted Mirror Concentrator" Developed by Scientific-Atlanta, Inc. FIGS. B40–B49, cited.

*Primary Examiner*—James C. Yeung
*Attorney, Agent, or Firm*—Edward L. Levine

[57] ABSTRACT

A solar energy concentrator including individually curved mirror slats arranged on a truss-type support structure to collectively form a substantially arcuate surface for concentration of incident radiation upon an elongated absorber. The reflector and absorber are fixed relative to one another by truss members, and the combined assembly is reciprocatingly rotatable by a linear actuator for tracking the position of the sun. The absorber includes fluid transfer tubes enclosed in a vacuum sealed multiple glass tube assembly.

9 Claims, 16 Drawing Figures

PRIOR ART

TRACKING SOLAR ENERGY CONCENTRATOR

BACKGROUND OF THE INVENTION

1. Field of the Invention

This invention relates to solar energy concentrators and more particularly provides a tracking concentrator having a reflector and affixed absorber reciprocatingly movable through a limited rotation.

2. Description of the Prior Art

As a result of energy concerns substantial attention is presently being given to new devices for conversion of energy, particularly the utilization of solar energy for provision of useful heat and generation of electrical power. One promising approach is the Fixed Faceted Mirror Concentrator (FFMC) developed by Scientific-Atlanta, Inc. The FFMC includes a reflector, fixed in position, and having elongated flat mirror slats arranged in an arcuate configuration. An elongated absorber is positioned parallel to the mirror slats and is reciprocatingly rotated along an arc approximately of the same circle as the mirror slats to track movement of the sun.

While the Scientific-Atlanta concept offers substantial benefits over other solar energy concentrators, there exists room for improvement in the overall efficiency of the system, particularly where high temperatures, those near and above 600° F., are desired. For example, since the reflector is fixed in position, there are limitations on the amount of incident radiation that is reflected upon the absorber throughout a yearly cycle. This is particularly true at the solstices, occurring in summer and winter in the United States when electrical loads for air conditioning and heating are high and energy is most needed. This effect is particularly evident at the edges of the FFMC reflector. Additionally, the elongated flat mirror slats and reflector assembly, while structurally sound, can be improved upon in their resistance to wind and other loadings, and by lessening the weight of the structure. And, the location of the absorber is restricted to the boundary of the mirror circle, limiting design flexibility.

Accordingly, it is desirable to provide a solar energy concentrator which improves upon system efficiency and structural integrity as compared to the Scientific-Atlanta and other solar energy utilization concepts.

SUMMARY OF THE INVENTION

This invention provides a solar energy concentrator with substantial benefits in system efficiency and structural integrity while providing a relatively lightweight structure with capabilities for relatively low cost shop fabrication and simplified in situ maintenance. The main features of the apparatus include reflector tracking, curved mirror slats, a wire-braced modular structure, a relatively simple jack-type tracking device for rotating a plurality of the modules, an evacuated glass absorber/insulator, and design flexibility particularly with respect to relative absorber-reflector geometry.

In a preferred embodiment the concentrator is a modular structure including individually curved elongated mirror slats collectively arranged to form an arc of a cylindrical mirror trough. A suitable geometric relationship between the trough radius, the individual slat radii and the angle of inclination of each slat allows incident radiation to be focused generally at the center of curvature of the mirror trough, or any other desired focal line. An elongated tubular absorber is fixed to the reflector along the line of focus by truss members which allow for absorber axial expansion, and radial expansion between absorber tubes is also accommodated. The reflector and affixed absorber are pivotally connected to a trunnion support which includes a linear jack or other mechanism to rotate the assembly and track movement of the sun.

An individual reflector module includes two end ribs having steps selectively oriented and approximating the arc of a circle. Support channels are fixed to the steps and the arcuately curved elongated mirror slats are affixed to the channels by clips. The ribs are affixed to one another by cross angles and tension cables positioned behind the mirror trough which form a strong yet lightweight truss-type structure. Each arcuate mirror slat preferably has a radius of curvature twice as large as the assembly trough radius of curvature and is inclined at an angle of $\frac{1}{2}\theta$ where $\theta$ is the included angle between the incident and reflected radiation at the center of the slat.

The preferred absorber, positioned parallel to the slats at the line of focus of the reflector, which is generally the reflector center of curvature in the reference arrangement, includes two fluid transport tubes brazed to a plate centered diametrically within two concentric glass tubes. A utilization fluid is heated as it flows through the absorber fluid transport tubes. A vacuum is maintained in an annulus provided between the concentric glass tubes to alleviate gaseous conduction and convection between them. The ends of the concentric tubes are sealed in a manner which allows for differential expansion, such as the use of bellows, and a vacuum maintaining getter is disposed in the annulus.

The absorber assembly is fixedly positioned relative to the reflector by end truss members and standoffs which alleviate heat loss to the structure. One end of the modular glass tubes is supported by one of the end trusses through a pinned joint which provides radial and axial restraint, and the other end is provided with radial restraint only to accommodate differential axial expansion of the components. This truss support arrangement is spaced at intervals which alleviate shadowing interference with the radiation incident on the reflector.

The mirror array, affixed absorber and reflector truss supports enhanced by cables yield a rigid modular structure that is supported at each end of a reflector module by trunnions. A linear actuator such as a screw jack is pivotally affixed to every other trunnion and to two adjacent reflector modules to reciprocatingly rotate the assembly through a limited sun-tracking rotation. The opposite ends of the adjacent modules rotate on pivots of the trunnion supports. A singular drive motor can be used to drive the jacks for a string of aligned adjacent modules through a common shaft.

The advantages of the disclosed concentrator are substantial, and include an approximately one-third increase in system efficiency as compared to the Scientific-Atlanta fixed reflector concept. The increased efficiency and corresponding higher temperatures render the concentrator more compatible with central-station power generation. Curvature of the individual mirror slats provides increased rigidity and strength as compared to flat slats, and accordingly less replacement. The arcuate nature of the trough and slats and the fixed relation to the absorber also allows increased design flexibility, particularly with respect to relative reflector-absorber positioning. The absorber can advantageously be positioned between the center of curvature of the trough arc and the boundary of the trough arc circle. Not being limited in position to the perimeter of the arc circle, the absorber support structure length is substantially lessened and the configuration substantially simplified.

Additionally the reflector truss and cable arrangement is relatively strong and lightweight, allowing a single drive to be utilized for a plurality of modules. The clipped mirror slat structure also allows ease of slat replacement, if necessary, and the entire concentrator assembly can be easily fabricated. The reflector/absorber tracking also allows greater flexibility in fabrication and installation tolerances as compared to a fixed reflector. The disclosed absorber further allows for differential thermal expansion and accordingly less stress and increased life. And, shadowing effects of the absorber supports and end losses are also lessened, contributing to the high efficiency.

BRIEF DESCRIPTION OF THE DRAWINGS

The advantages, nature and additional features of the concentrator will become more apparent from the following description, taken in connection with the accompanying drawings, in which.

DESCRIPTION OF THE PREFERRED EMBODIMENTS

Figure 1:
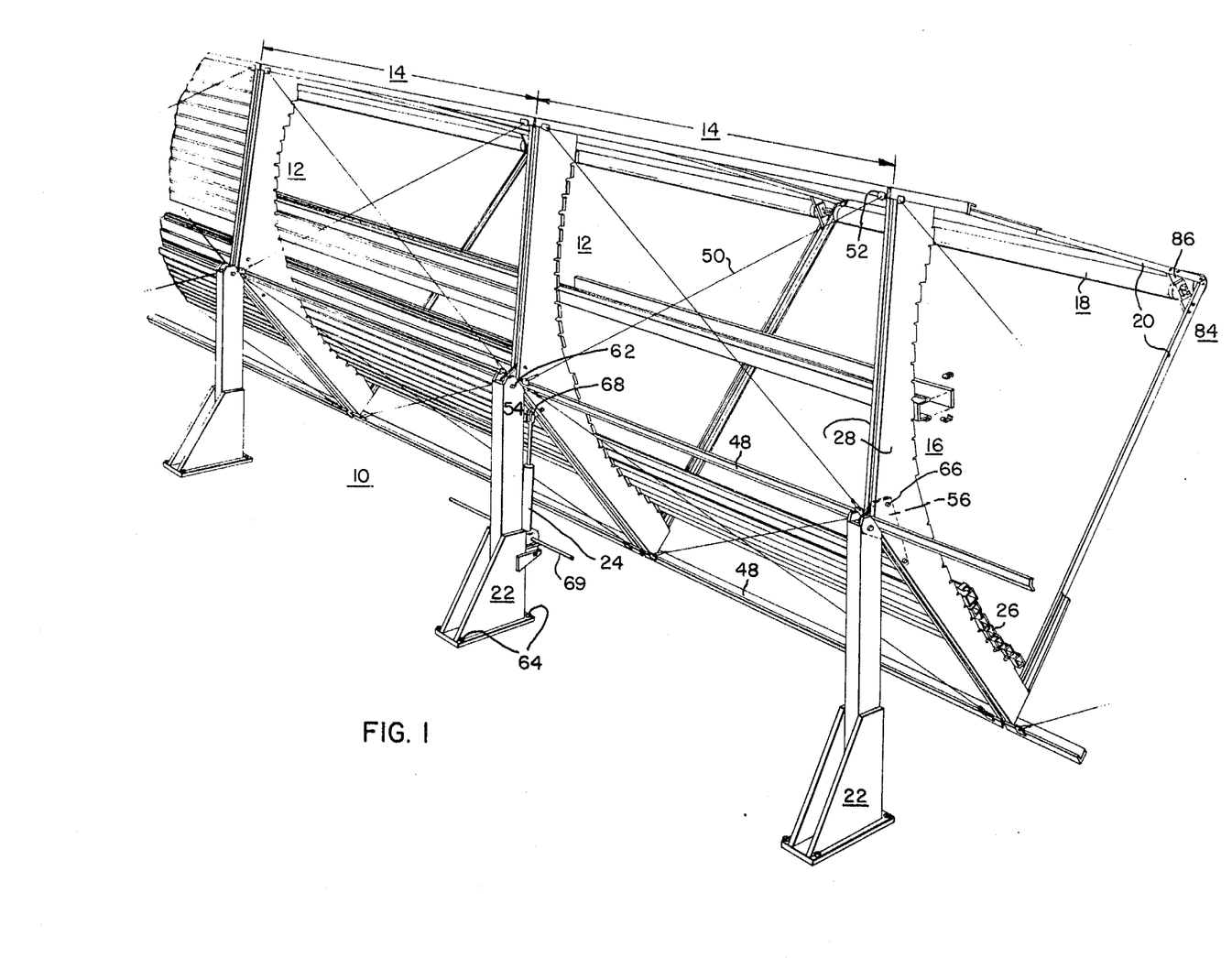
FIG. 1 is a perspective view of a modular solar concentrator in accordance with a preferred embodiment of the invention.
Figure 2:
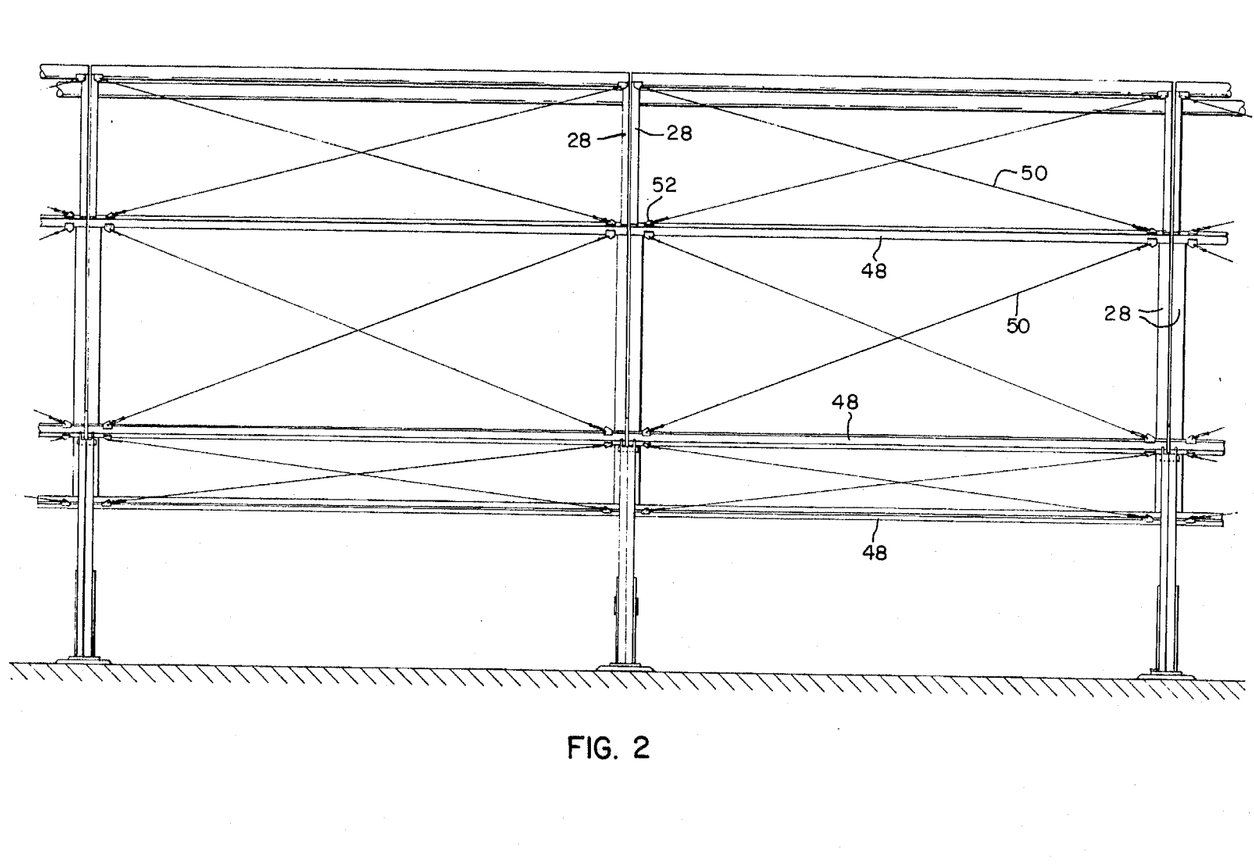
FIG. 2 is a rear view of a portion of the concentrator of FIG. 1.

Referring now to FIG. 1 there is shown an exemplary tracking solar energy concentrator 10 in accordance with an embodiment of the invention. The concentrator includes a plurality of modules 12, cooperatively joined as discussed hereafter. A single module is outlined by the dimension numbered 14, and includes a radiation reflector 16, portions of an absorber 18 and structure affixing the reflector and absorber such as the truss struts 20. The modules 12 are interconnected and are pivotally supported upon trunnions 22. Linear actuators such as a screw jack 24 reciprocatingly rotate the reflector 16 and affixed absorber 18 to track the sun.

Figure 4:
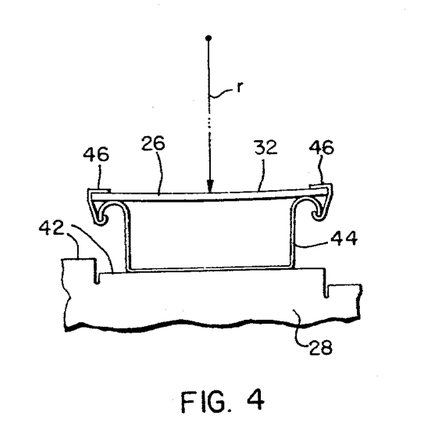
FIG. 4 is an elevation view of a mirror slat support arrangement.
Figure 5A:
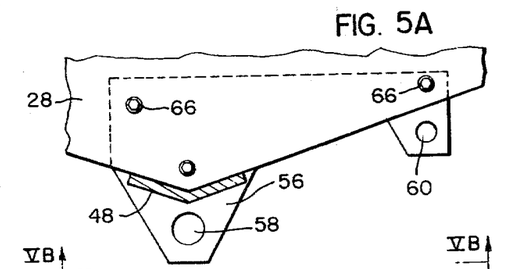
FIG. 5A is an elevation view of a portion of the pivot of FIG. 1.
Figure 5B:
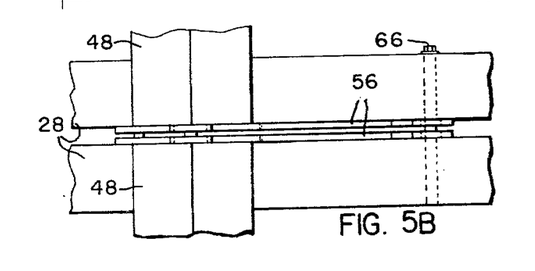
FIG. 5B is a view taken at VB—VB of FIG. 5A.
Figures 6, 7:
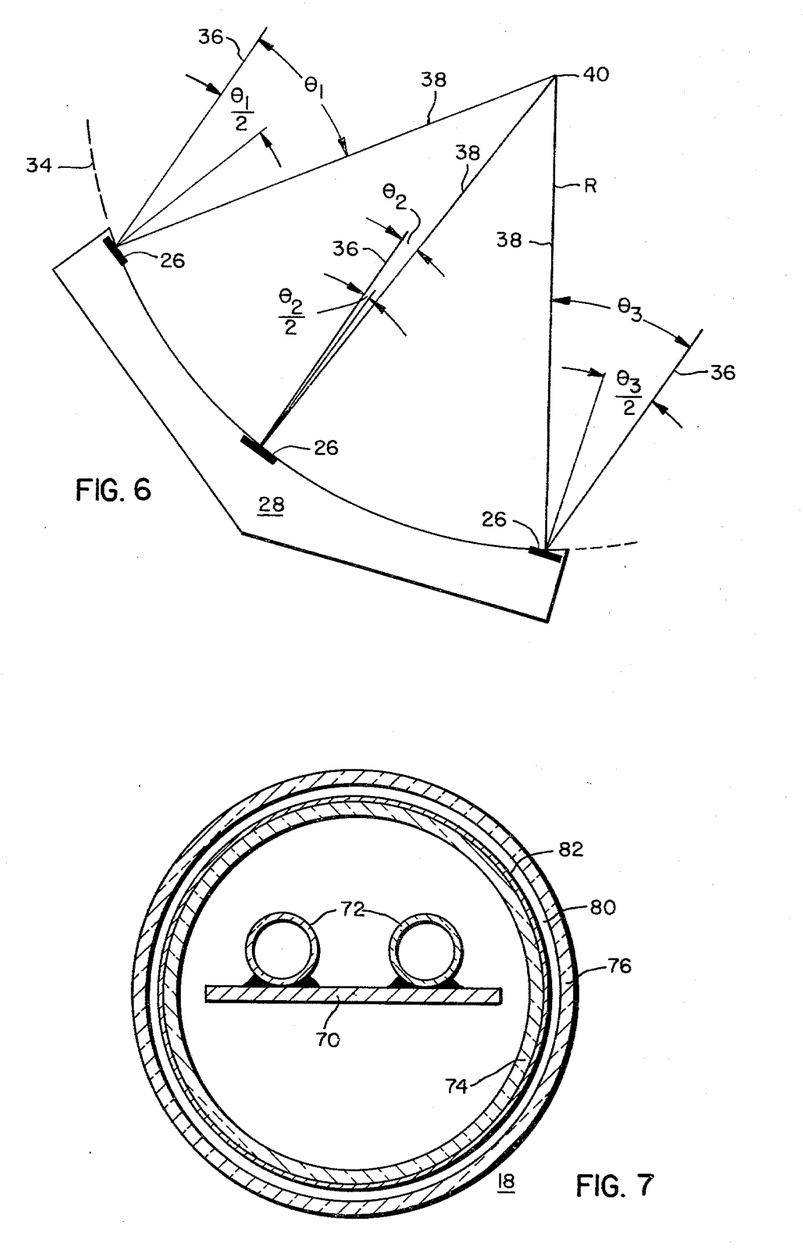
FIG. 6 is a schematic representation of the angular relationships of components of the preferred concentrator.
FIG. 7 is a cross section of an evacuated absorber in accordance with this invention.

Additional detail of the reflector 16 structure is shown in FIGS. 2 through 5. The preferred reflector includes twenty-six 4-inch wide preferably back-silvered curved mirror slats 26 extending 12 feet between module end ribs 28. The mirror slats 26 collectively form a seventy-two degree arc cylindrical mirror trough 30 with a ninety-seven inch radius of curvature, R. Each mirror slat has a cylindrical surface 32 with a radius of curvature twice that of the trough radius, or one hundred ninety-four inches in the exemplary embodiment. The chord of each slat is inclined at an angle so that it does not correspond to the tangent of the trough arc 34 at each location. The preferred angle of inclination is $\theta/2$, where $\theta$ is the included angle between the incident 36 and reflected 38 light rays at the center of the mirror slat (FIG. 6). With the geometric relationship described between the trough and slat radii of curvature and the angle of inclination, the light incident upon each mirror slat will be focused at about the center of curvature 40 of the mirror trough. While in the preferred embodiment reflected radiation is focused at the trough center of curvature, it is to be understood that the invention offers great flexibility in positioning the absorber relative to the reflector merely by varying the inclination of the chords of the slats. The positioning flexibility provides further flexibility in absorber support design. The line of focus of reflected radiation, where the absorber is positioned, will preferably lie between the center of curvature of the trough arc circle and the periphery of the circle opposite the reflector, which can also be expressed as lying at a distance between one and two times the radius of curvature of the trough arc circle.

It will be noted that the 194-inch radius of curvature, r, of the slats corresponds to a sagitta of 10.3 mils for a 4-inch wide slat. However, if the sagitta varies from, for example, 8.3 to 12.3 mils, the focal point (two dimensions) or line (three dimensions) will have a width of only 0.8 inches, substantially smaller than the cross-sectional dimension of an absorber. It should be noted that the choice of mirror element parameters such as width and sagitta for any given concentrator will include an evaluation of the effects of strength of the slats to withstand loadings such as hail and the easier fabrication and lower cost of fewer slats.

The mirror slats 26 are supported upon the steps 42 of the end ribs 28 by mirror support channels 44 shown best in FIG. 4. The steps 42 can be angled, preferably at $\theta/2$ as described above. The slats 26 are affixed to the channels 44 by clips 46. It will be evident that this arrangement provides simplified mirror-slat installation and replacement, if necessary.

Referring again to FIGS. 1 and 2, the end ribs 28 are joined by a truss-type lightweight arrangement of cross members or angles 48 and tension cables 50. The cross angles 48 are preferably oriented parallel to the mirror slats 26, as shown, and the cables 50 join couplings 52 at opposite ends of consecutive cross angles. The cross angles can be affixed to the end ribs by conventional means including welding or bolting, and can also be affixed through the pivot and trunnion structures as described hereafter.

Figure 3:
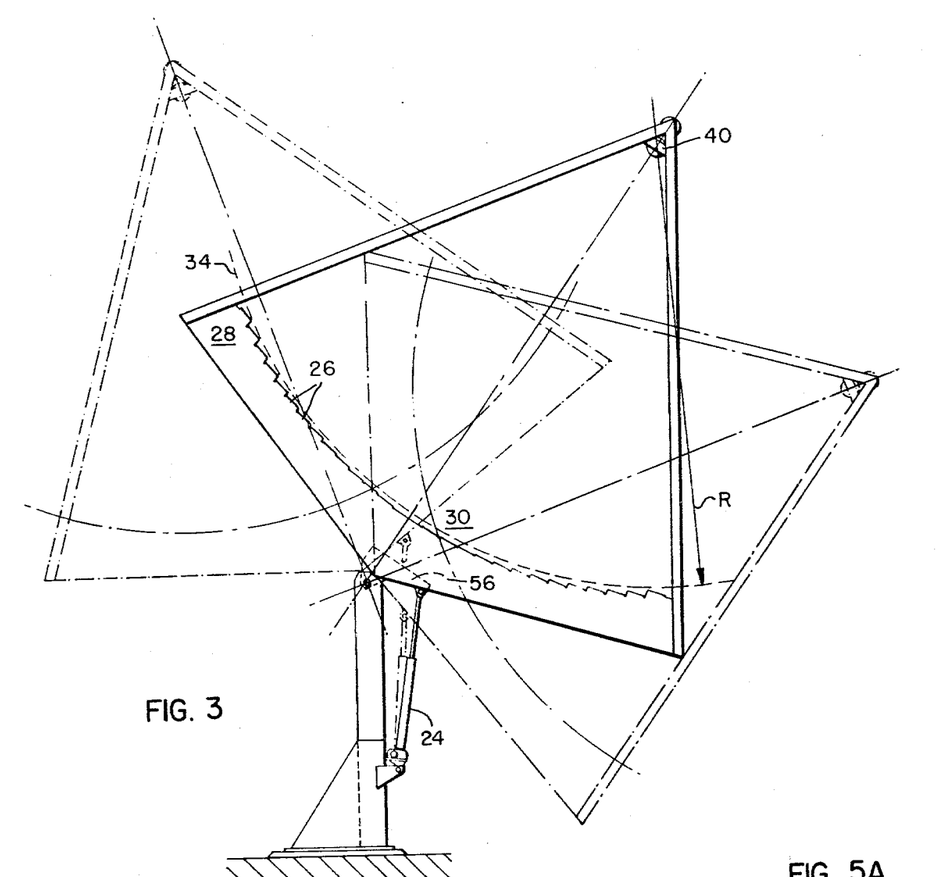
FIG. 3 is an end view of a portion of the concentrator of FIG. 1.

Adjacent modules 12 are affixed through their end ribs 28. The fixture arrangement can include joining of the end ribs 28 with a pivot assembly 54 for reciprocatingly rotating the modules. As shown in FIGS. 1, 3 and 5, two pivot plates 56 are disposed between the adjacent end ribs 28, and include apertures 58, 60. Through aperture 58 is disposed a fixed pivot pin 62 which is joined to the trunnions 22. The trunnions 22 can be attached to a ground support structure by bolts 64. The pivot plates 56 are attached to one another and to the end ribs by connecting means such as bolts 66. The bolts 66 can also pass through and join turned ends of the cross angles 48.

Through aperture 60 passes a moving pivot 68 which forms part of the means for reciprocatingly rotating the reflector and affixed absorber. The preferred rotating means includes a linear actuator such as the screw jack 24. The screw jack is affixed at the other end to the trunnion 22. Extension and retraction of the screw jack 24 will cause the reflector to reciprocatingly move through a preselected rotation, several positions of which are indicated in FIG. 3. While other rotational drive means such as a gear box can be utilized, a linear actuator is preferred for simplicity and reliability. Additional discussion of the relative positioning of the pivot with respect to the other components is provided with respect to FIG. 12. Each end of the module can be associated with a screw jack or, as shown, only one end need be so connected and the other end can freely pivot on the next adjacent trunnion. Thus, a single screw jack will rotate two adjacent modules. Further, where a number of modules, for example eight, are adjacent in a string, the required four screw jacks can all be driven by a single common drive motor and shaft 69. And, a single master sun tracker can be utilized to receive, process and feed control information for rotation of an entire collector field having a plurality of collector module strings. It should also be noted that when the trough and angle of incident radiation are considered in three dimensions, the incident radiation will approach, at some times, the reflector at an angle other than perpendicular to the slats. Accordingly, some end losses will occur and should be considered when evaluating a specific concentrator design.

Figure 8A:
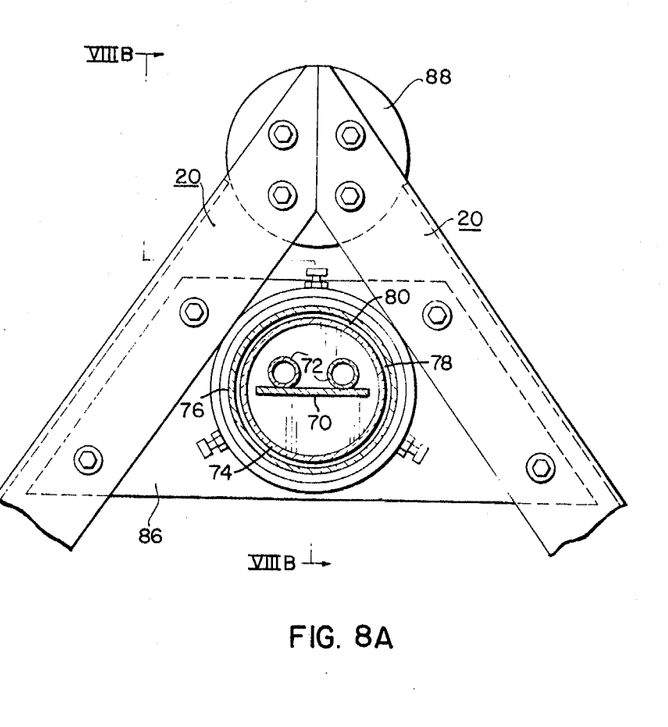
FIG. 8A is a view of a portion of the sealed end of an absorber and its support in accordance with the invention.
Figure 8B:
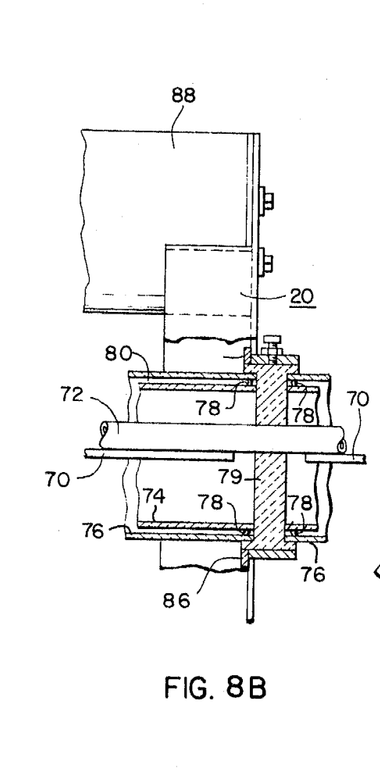
FIG. 8B is a view taken at VIIIB—VIIIB of FIG. 8A.

Referring now to FIG. 7, the preferred absorber 18 includes a 2.5 inch wide × 0.125 inch thick steel plate 70 with two 0.625 inch O.D. × 0.5 inch I.D. utilization fluid transport tubes 72 brazed to one surface. The plate 70 is preferably centered diametrically within inner 74 and outer 76 concentric glass tubes. While the concentric tubes 74, 76 can extend the length of a plurality of adjacent reflector modules, they preferably are the same length as a reflector module, approximately 12 feet in the exemplary embodiment. The fluid transport tubes 72 extend, however, preferably the length of an adjacent string of modules. The inner tube 74 has a 3 inch I.D. and 3.375 inch O.D., and the outer tube 76 has a 3.5 inch I.D. and a 3.75 inch O.D. The tubes are glass, and are sealed to one another at their ends such as by glass/metal vacuum tube seals which accommodate differential thermal expansion between the tubes 74, 76. Shown in FIG. 8B are metallic bellows 78 which accommodate the expansion and insulating means 79 between adjacent absorber lengths which are preferably configured and made to facilitate axial expansion means such as the bellows 78 are utilized since the two concentric glass tubes will, in the presence of insulation, reach different temperatures. The outer tube 76 will operate near ambient conditions and the inner tube 74 near the absorber operating temperature.

The glass tubes 74, 76 are spaced to define an annulus 80 therebetween, and a vacuum is drawn between the tubes after sealing to alleviate both gaseous conduction and convection between them. A getter 82 (FIG. 7), of a material which absorbs species such as hydrogen and moisture, such as zirconium and its alloys, is banded about the inner tube 74 to maintain the vacuum. Each of the glass tubes is provided, on its inner and outer surfaces, with a thin coating preferably having an index of refraction of between approximately 1.2 and 1.3 to reduce the loss due to normal reflection at each surface. The fluid transport tubes 72 are preferably coated with a material having preselected absorptivity and emissivity characteristics. For example, black chromium oxide has an absorptivity for solar radiation ($\lambda > 3$ $\mu m$) of 0.95 and an emissivity for long infrared radiation ($3 < \lambda < 15$ $\mu m$) of 0.25.

The elongated tubular absorber 18 is positioned parallel to and along the line of focus of the mirror slats. In the exemplary embodiment the line of focus is the center of curvature of the cylindrical mirror trough 30. The absorber glass tubes 74, 76, approximately 12 feet long in the exemplary concentrator, are supported by a truss 84 formed by the truss struts 20 connected to each other and to the end ribs 28, shown best in FIGS. 1 and 8A. A truss is preferably located at each end of a module. A support tube 88 can also be used for fixturing the struts 20 and for added rigidity. The fluid transport tubes 72 are continuous for a string of adjacent modules. Differential axial expansion of the fluid transport tubes 72, relative to the balance of the absorber and its support structure, can be accommodated by securing the tubes 72 to one of the module end trusses 84 near the middle of the string of modules, and allowing the ends of the tubes 72 to move axially. Standoffs 86 are used to secure the fluid transport tubes 72 to the end trusses 84 to minimize the heat loss to the supporting structure. Insulated flexible hoses can be used to connect the fluid transport tubes 72 to ground supported fluid piping which delivers the utilization fluid to desired apparatus for heat transfer.

Figure 9A:
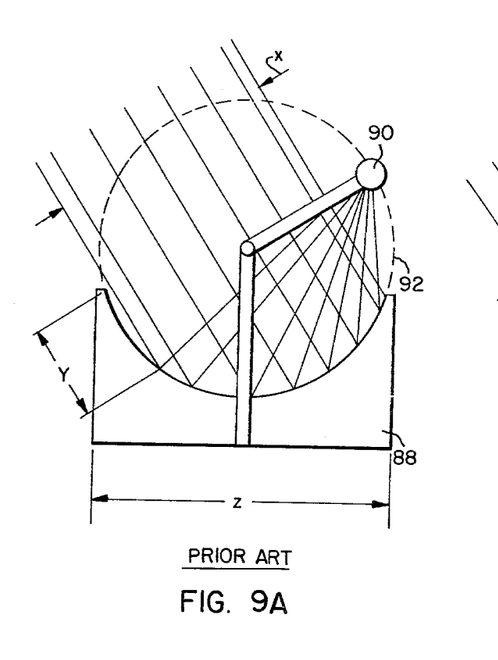
FIG. 9A is a schematic representation of a prior art fixed-reflector concentrator.
Figure 9B:
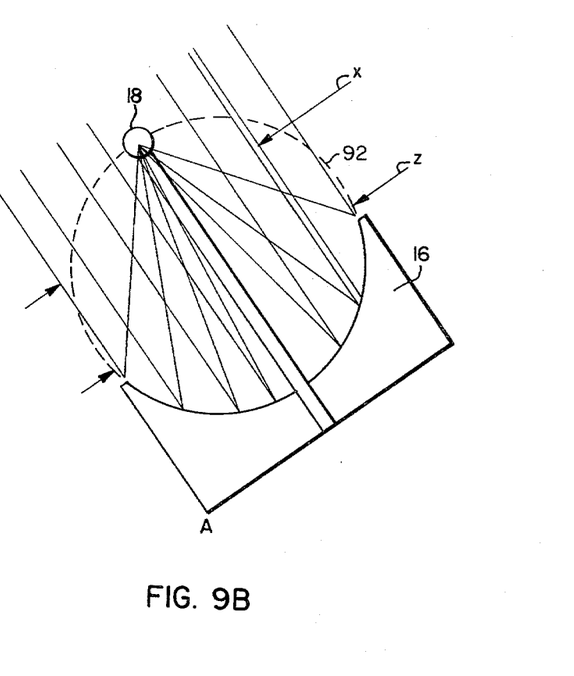
FIG. 9B is a schematic representation, similar to FIG. 9A, of a disclosed embodiment of a concentrator in accordance with the invention.
Figure 10:
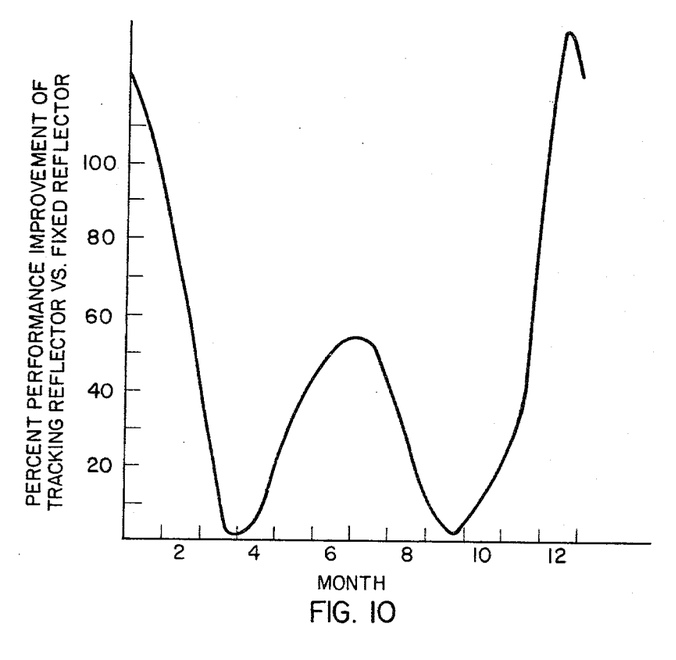
FIG. 10 is a graphical representation of the increase in incident radiation upon a tracking reflector as compared to a fixed reflector during the twelve months of a year.

Dependent upon the geographical location of the collector, it can be positioned for north-south or east-west tracking of the sun. The rotational nature of both the reflector and absorber provide the user with a great deal of positioning flexibility while maintaining high efficiency. In an east-west tracking orientation, some applications of the invention can be enhanced by elevating the high latitude end of the concentrator, which will alleviate end losses. The selection of the angle, from the horizontal, to which the concentrator is so displaced, can be dependent upon desired preference regarding energy for summer or winter application. One of the prime advantages of the disclosed collector over a fixed reflector collector assuming, for example, both are oriented with the mirror trough axis east-west, is that the apparent aperture of the reflector follows the sun's apparent north-south motion both seasonally and daily. This increases the incident insolation because the north-south dimension of the apparent cross section of the aperture remains substantially constant. Further, there is minimal shading of mirror segments near the edge of the reflector, even where a large fraction of the mirror trough is filled with mirror segments. Additionally, the shading effect, discussed hereafter with respect to FIGS. 9A and 9B, is a greater portion of the daily energy collection in the winter and summer in the United States, a time when heating and cooling loads are greatest. A representation of the improved efficiency as compared to a fixed mirror concept is presented schematically in FIGS. 9A and 9B. FIG. 9A represents a prior-art type fixed mirror 88, rotating absorber 90 concentrator having mirror slats oriented to focus incident radiation upon the absorber 90 as it traverses the mirror arc 92 tracking the apparent north-south motion of the sun. FIG. 9B represents the disclosed concentrator having an absorber 18 fixedly attached to the reflector 16 also along the mirror arc 92. Point "A" represents the having pivot about which the reflector and affixed absorber are rotated. From a comparison of the Figures it can be seen that with the disclosed concentrator, the shadow area identified at "Y" in FIG. 9A is substantially eliminated. The shading effect, area "Y", is a greater proportion of the daily energy collection in the winter and summer months, which is the prime reason for the main difference in the overall system annual efficiency. Further, the Figures show that the apparent aperture between the fixed reflector and tracking reflector arrangements is increased by the ratio (z−x/x). FIG. 10 is a graphical representation of the percentage improvement in incident radiation on the reflector of the disclosed tracking reflector (FIG. 9B) as compared to a fixed reflector with absorber tracking (FIG. 9A). The annual increase is approximately 32%.

Figure 11A:
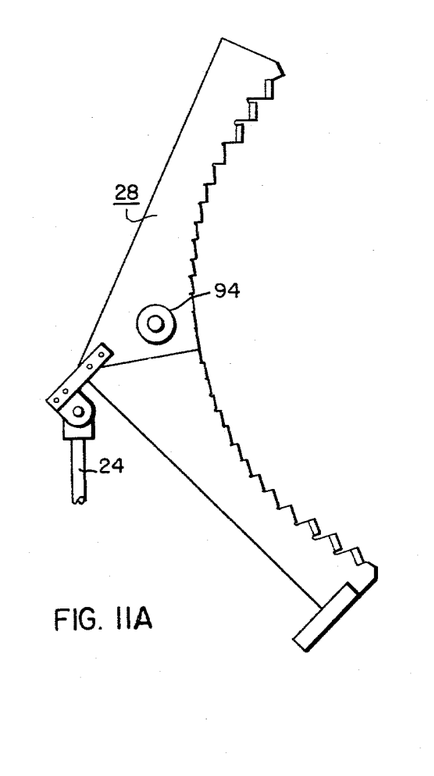
FIGS. 11A and 11B are simplified side views of a reflector in accordance with the invention showing alternative pivot positions.
Figure 11B:
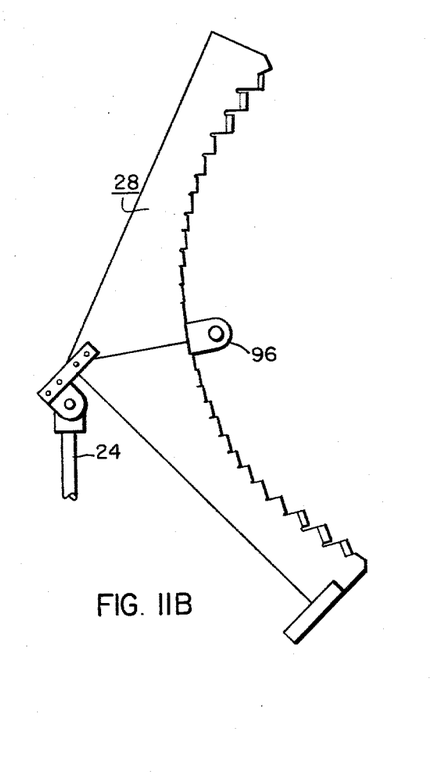

While in the exemplary embodiment the pivot or hinge and jack for rotating the reflector and affixed absorber are located at the rear of the reflector, it will be apparent that other positions can also be desirable dependent upon engineering considerations such as jack loading and structure rigidity. Typical alternate positions are illustrated in FIGS. 11A and 11B. FIG. 11A illustrates a configuration where a hinge 94 is located within the envelope defined by the end ribs 28. In FIG. 11B a hinge 96 is located in the front portion of the reflector, and the hinge and connecting components will here limit the mirror surface available for incident radiation.

It should further be noted that the relative positioning of the moving components substantially affects the sizing and other parameters of a linear or any other suitable actuator for rotary displacement. There are an infinite number of combinations of actuator positions and stroke lengths that provide the same desired angle of travel, as illustrated in FIG. 12.

Figure 12:
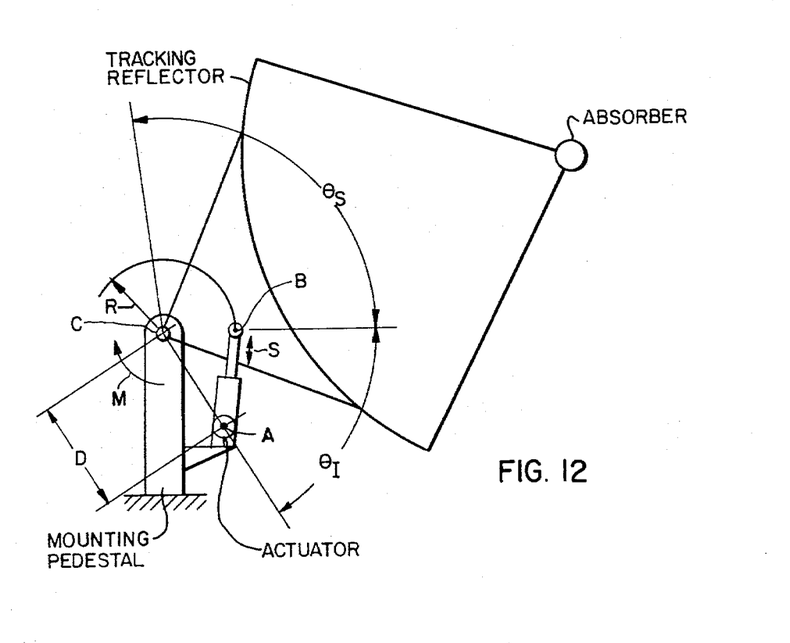
FIG. 12 is a side view schematic of a tracking reflector in accordance with the invention.

In FIG. 12 "D" is the distance from the fixed pivot "A" of the actuator to the fixed pivot "C" of the rotating reflector; "B" is the moving pivot shared by the actuator and the rotating reflector; "$\theta_I$" is the initial angle of the rotating reflector measured between BC and AC; $\theta_S$ is the sweep angle of the reflector; "R" is the radius of sweep of pivot B, which is equal to the distance between B and C; "S" is the stroke of the actuator; and "M" is the moment applied about the pivot C mounting pedestal, and includes forces from such parameters as concentrator weight and wind loading. Assuming that the desired output of the kinematic linkage is to produce a desired sweep angle $\theta_S$, it can be seen that if R is made short, S can be kept small, but the force required to counteract M becomes large, resulting in a more stout and costly actuator. If R is made large, the force required of the actuator is reduced, but S becomes larger and raises concerns over buckling, again resulting in a more sturdy and expensive structure. If $\theta_I$ is made small and D large, the forces again can become very large at the start of the sweep angle and therefore require a large actuator. Accordingly, careful attention and engineering judgment should be exercised in choosing and positioning a particular actuator.

It will be apparent that many modifications and additions are possible in view of the above teachings. It therefore is to be understood that within the scope of the appended claims, the invention can be practiced other than as specifically described.

I claim:

1. A solar energy concentrator comprising:
   a. an elongated absorber;
   b. an elongated reflector assembly having a plurality of curved mirror slats arranged in an arcuate orientation of radius R, each said curved slat being arcuate of radius 2R;
   c. structure for supporting said absorber in a fixed position relative to said reflector assembly at about the center of curvature of said arcuate orientation; and
   d. structure for reciprocatingly rotating said reflector assembly and affixed receiver through a predetermined angular rotation, said structure including a rectilinearly reciprocable jack member supported on a trunnion, said trunnion having a fixed pivot cooperatively associated with said reflector assembly, said reflector and jack member being joined by a moving pivot which rotates about said fixed pivot upon extension and retraction of said jack member, said fixed pivot being positioned behind said mirror slats.

2. A solar energy concentrator comprising:
   a. an elongated reflector assembly having a plurality of curved mirror slats arranged in an arcuate orientation of radius R, each said curved slat being arcuate of radius 2R, the chord of each said slat being inclined at an angle of $\theta/2$, where $\theta$ is the included angle between incident and reflected light rays at the center of each said slat;
   b. an elongated absorber;
   c. structure for supporting said elongated absorber in a fixed position relative to said reflector assembly at about the center of curvature of said arcuate orientation; and
   d. structure for reciprocatingly rotating said reflector assembly and affixed absorber through a predetermined rotation.

3. The solar energy concentrator of claim 2 wherein said elongated absorber comprises:
   a. an elongated outer glass tube;
   b. an elongated inner glass tube disposed concentrically within and spaced from said outer glass tube; and
   c. means for maintaining a vacuum in said space between said tubes comprising a metallic getter banded about said inner glass tube.

4. The solar energy concentrator of claim 3 wherein said metallic getter consists of a material selected from the group of zirconium and alloys of zirconium.

5. The solar energy concentrator of claim 2 wherein said absorber is disposed along a line parallel to the line of the center of curvature of said arcuate orientation of radius R, at a distance from said mirror slats of between one and two times R.

6. The solar energy concentrator of claim 2 wherein said structure for supporting said absorber comprises a truss formed by two struts connected to each other and to said reflector assembly and a standoff affixed to said struts, said absorber being affixed to said standoff and spaced from said struts.

7. The solar energy concentrator of claim 6 wherein said structure for rotating said reflector and receiver comprises a rectilinearly reciprocable jack member supported on a trunnion, said trunnion having a fixed pivot cooperatively associated with said reflector assembly, said reflector and jack being joined by a moving pivot which rotates about said fixed pivot upon extension and retraction of said jack, said fixed pivot being positioned behind said mirror slats.

8. The solar energy concentrator of claim 2 wherein said reflector assembly further comprises two spaced slat support ribs disposed generally perpendicular to said slats and being generally arcuate having a center and two ends, said slats being affixed to said ribs, a plurality of rigid coextending cross members affixed to said ribs substantially parallel to said slats, and a plurality of tension cables connecting opposite ends of selected cross members in a generally x-shaped arrangement.

9. A solar energy concentrator comprising:
  a. an elongated reflector assembly having a plurality of curved mirror slats arranged in an arcuate orientation of radius $R$, each said curved slat being arcuate of radius $2R$;
  b. an elongated absorber;
  c. structure for supporting said elongated absorber in a fixed position relative to said reflector assembly at a distance of between $R$ and $2R$; and
  d. structure for reciprocatingly rotating said reflector assembly and affixed absorber through a predetermined angular rotation, said structure including a rectilinearly reciprocable jack member supported on a trunnion, said trunnion having a fixed pivot cooperatively associated with said reflector assembly, said reflector and jack member being joined by a moving pivot which rotates about said fixed pivot upon extension and retraction of said jack member, said fixed pivot being positioned behind said mirror slats.

* * * * *